US011821815B2

(12) United States Patent
Nakano

(10) Patent No.: US 11,821,815 B2
(45) Date of Patent: Nov. 21, 2023

(54) DISPLACEMENT MEASUREMENT APPARATUS FOR STRUCTURE

(71) Applicant: NEC Corporation, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 129 days.

(21) Appl. No.: 17/439,006

(22) PCT Filed: Mar. 26, 2019

(86) PCT No.: PCT/JP2019/012993
§ 371 (c)(1),
(2) Date: Sep. 14, 2021

(87) PCT Pub. No.: WO2020/194540
PCT Pub. Date: Oct. 1, 2020

(65) Prior Publication Data
US 2022/0146366 A1 May 12, 2022

(51) Int. Cl.
G01M 5/00 (2006.01)

(52) U.S. Cl.
CPC .......... G01M 5/005 (2013.01); G01M 5/0008 (2013.01); G01M 5/0091 (2013.01)

(58) Field of Classification Search
CPC .. G01M 5/005; G01M 5/0008; G01M 5/0091; E01D 22/00; G01B 11/16
See application file for complete search history.

(56) References Cited

U.S. PATENT DOCUMENTS

| 2014/0190753 | A1 | 7/2014 | Mian et al. |
| 2018/0209883 | A1 | 7/2018 | Imagawa et al. |
| 2019/0212141 | A1* | 7/2019 | Takada ................ G01B 11/16 |

FOREIGN PATENT DOCUMENTS

| JP | H10-259700 A | 9/1998 |
| JP | H10-260017 A | 9/1998 |
| JP | 11023250 A * | 1/1999 |
| JP | H11-23250 A | 1/1999 |
| JP | 2000-011136 A | 1/2000 |
| JP | 2000011136 A * | 1/2000 |
| JP | 2005-182289 A | 7/2005 |
| JP | 2005182289 A * | 7/2005 |
| JP | 2012-126156 A | 7/2012 |
| JP | 2014-202468 A | 10/2014 |
| JP | 2016-084579 A | 5/2016 |
| JP | 2016084579 A * | 5/2016 |

(Continued)

OTHER PUBLICATIONS

International Search Report for PCT Application No. PCT/JP2019/012993, dated Apr. 23, 2019.

(Continued)

Primary Examiner — Raul J Rios Russo
Assistant Examiner — Carl F. R. Tchatchouang

(57) ABSTRACT

An apparatus includes an acquisition means for acquiring displacement quantity in a time-series manner, the displacement quantity being generated at a measurement part of a structure by the weight of a vehicle that travels on the structure, a detection means for detecting the size of the vehicle that passes through the structure and detecting the type of the vehicle from the size, and a control means for controlling the acquisition means on the basis of the detected type of the vehicle.

8 Claims, 11 Drawing Sheets

(56) References Cited

FOREIGN PATENT DOCUMENTS

| JP | 2018-204952 A | | 12/2018 | |
|---|---|---|---|---|
| JP | 2018204952 A | * | 12/2018 | |
| WO | 2018/138943 A1 | | 8/2018 | |
| WO | WO-2018138943 A1 | * | 8/2018 | ............. G01B 11/00 |

OTHER PUBLICATIONS

JP Office Action for JP Application No. 2021-508496, dated Jul. 26, 2022 with English Translation.

* cited by examiner

FIG. 2
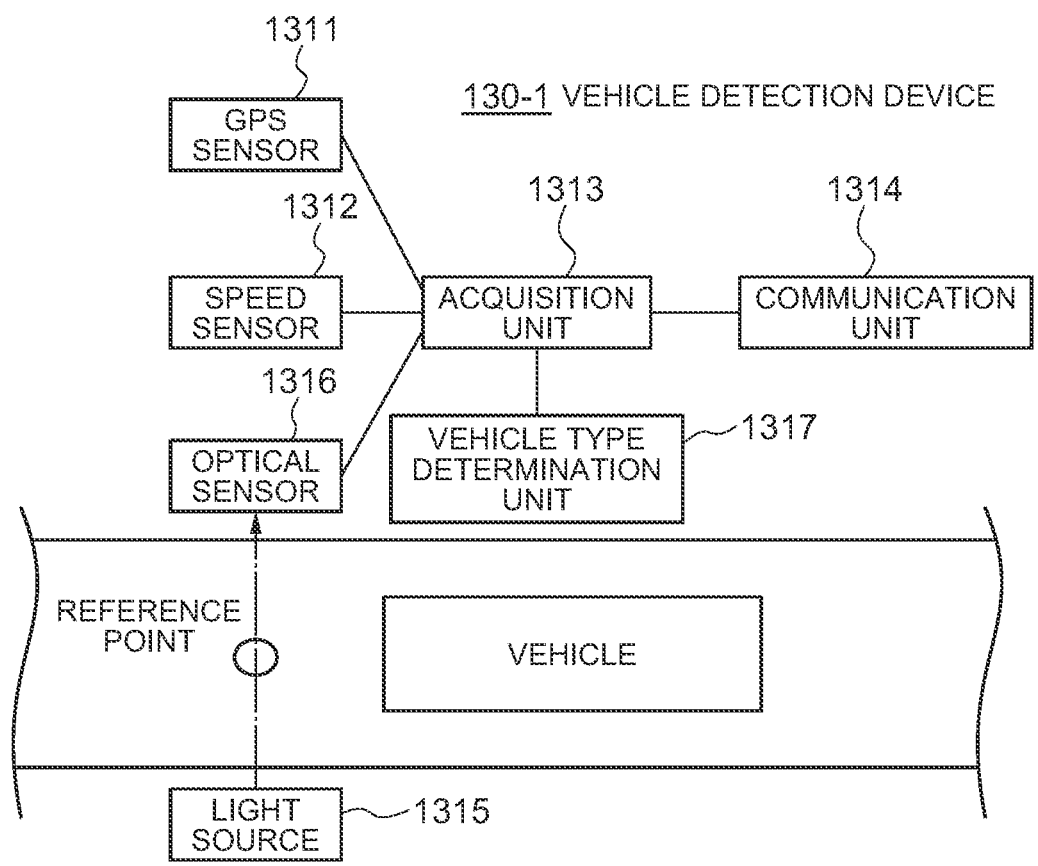
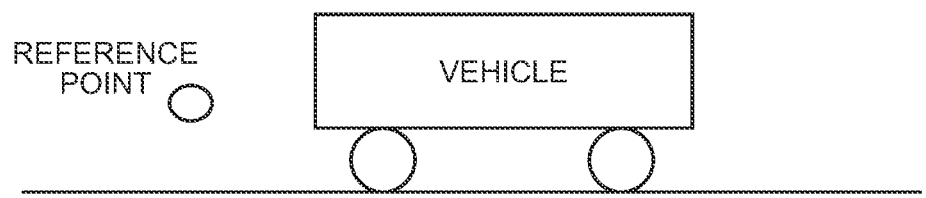

FIG. 3
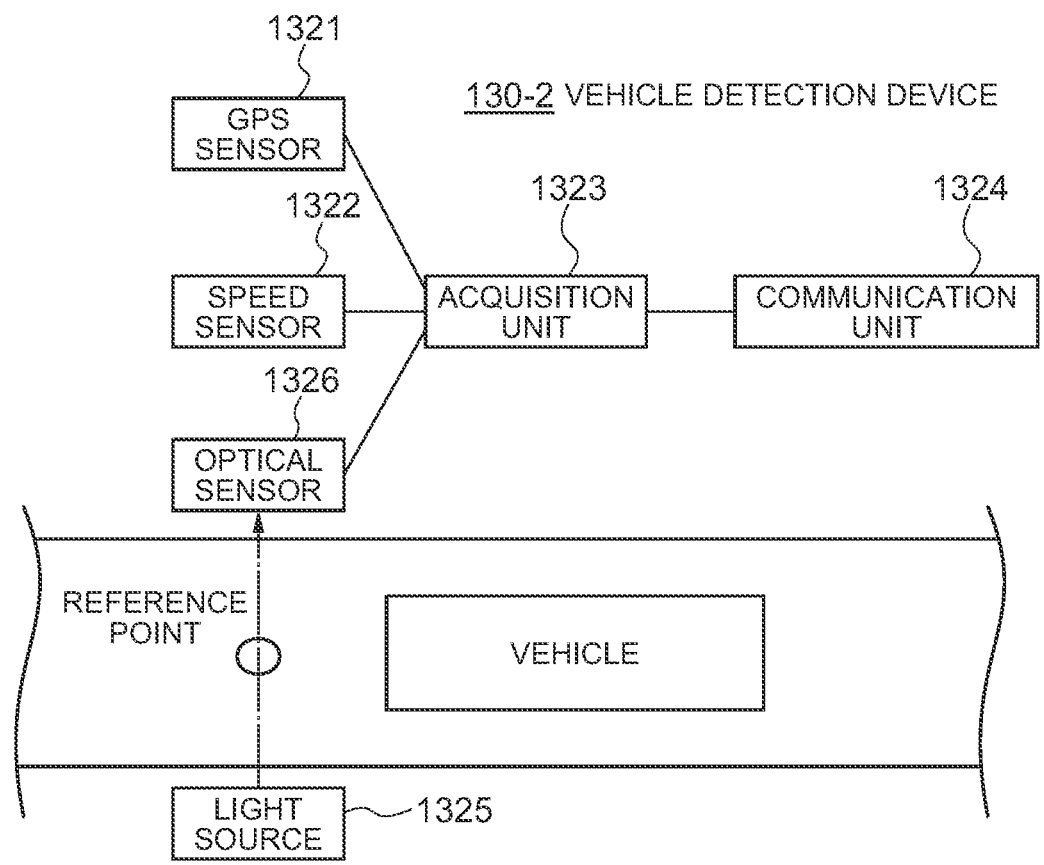
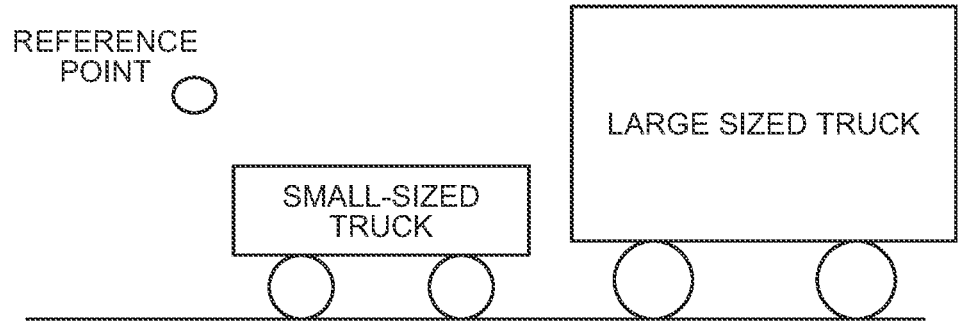

DISPLACEMENT MEASUREMENT APPARATUS FOR STRUCTURE

This application is a National Stage Entry of PCT/JP2019/012993 filed on Mar. 26, 2019, the contents of all of which are incorporated herein by reference, in their entirety.

TECHNICAL FIELD

The present invention relates to a displacement measurement apparatus for a structure, a displacement measurement method for a structure, and a storage medium.

BACKGROUND ART

When a vehicle passes through a structure such as a bridge, a load is applied to the structure and the structure is displaced. A variety of technologies are proposed to measure such a displacement of a structure.

For example, Patent Literature 1 describes a technology of measuring the deflection quantity of a bridge when a vehicle passes through the bridge, by using images captured by a video camera and a digital camera. Specifically, a feature of a vehicle travelling on a bridge is identified from a moving image captured by a video camera capturing the bridge, and at the timing that the vehicle is determined to be passing through the bridge, the bridge is captured by the digital camera, and distribution of the deflection quantity of the bridge is detected based on the captured image. Further, in Patent Literature 1, detection of an overloaded vehicle and the soundness evaluation of the bridge are performed on the basis of the distribution of the measured deflection quantity.

On the other hand, Patent Literature 2 discloses a travel control assisting method to assist travel control by a crew in order to reduce the alarming time in a wireless crossing control system for performing crossing control by using radio. In Patent Literature 2, when a train approaches a crossing, an on-vehicle device transmits the position and speed information of the own train to a crossing control device at given intervals. The crossing control device calculates an arrival estimation time of the train that will be taken until the train reaches the position of the crossing from the current position, on the basis of the position and the speed of the train received from the on-vehicle device. In Patent Literature 2, it is based on the premise that the crossing control device can receive the position and the speed of the train from the on-vehicle device in real time. Therefore, when a communication delay occurs, an error in the arrival estimation time may increase.

Patent Literature 1: JP 2016-84579 A
Patent Literature 2: JP 2012-126156 A

SUMMARY

The deflection quantity of a structure such as a bridge tends to be larger by a heavy vehicle than a lightweight vehicle. Therefore, there is a demand to measure the deflection quantity of a structure by paying attention to a heavy vehicle. However, it is difficult to easily detect a heavy vehicle.

An object of the present invention is to provide a displacement measurement apparatus for a structure that solves the problem described above.

A displacement measurement apparatus for a structure, according to one aspect of the present invention, includes
an acquisition means for acquiring displacement quantity in a time-series manner, the displacement quantity being generated at a measurement part of the structure by the weight of a vehicle that travels on the structure,
a detection means for detecting the size of the vehicle that passes through the structure, and detecting the type of the vehicle from the size, and
a control means for controlling the acquisition means on the basis of the detected type of the vehicle.

Further, a displacement measurement method for a structure, according to one aspect of the present invention, includes
acquiring displacement quantity in a time-series manner, the displacement quantity being generated at a measurement part of the structure by the weight of a vehicle that travels on the structure,
detecting the size of the vehicle that passes through the structure, and detecting the type of the vehicle from the size, and
controlling the acquisition on the basis of the detected type of the vehicle.

A computer-readable storage medium, according to one aspect of the present invention, stores therein a program for causing a computer to perform processing of
acquiring displacement quantity in a time-series manner, the displacement quantity being generated at a measurement part of the structure by the weight of a vehicle that travels on the structure,
detecting the size of the vehicle that passes through the structure, and detecting the type of the vehicle from the size, and
controlling the acquiring on the basis of the detected type of the vehicle.

With the configurations described above, the present invention enables easy detection of a heavy vehicle.

BRIEF DESCRIPTION OF THE DRAWINGS

FIG. 2 is a block diagram illustrating an example of a vehicle detection device in the displacement measurement apparatus according to the first exemplary embodiment of the present invention.

FIG. 3 is a diagram illustrating another example of a vehicle detection device in the displacement measurement apparatus according to the first exemplary embodiment of the present invention.

EXEMPLARY EMBODIMENTS

First Exemplary Embodiment

Figure 1:
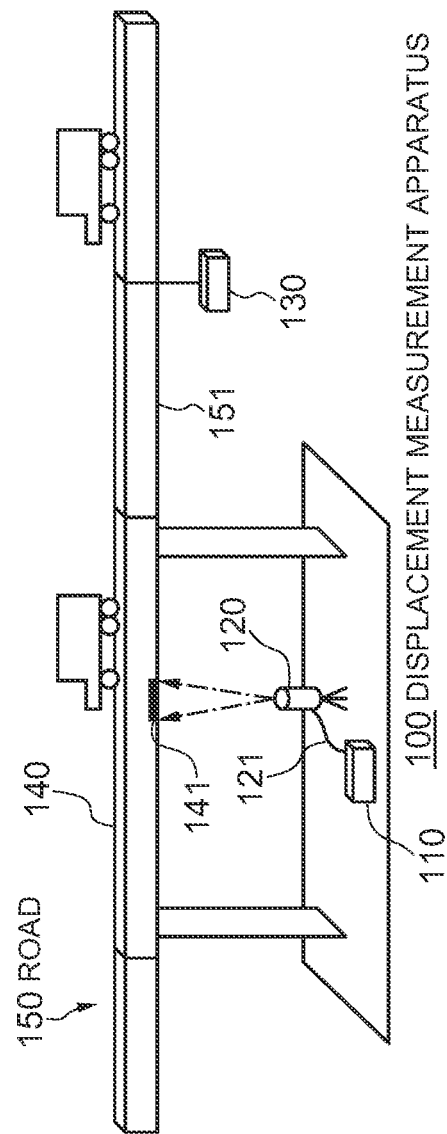
FIG. 1 is a diagram illustrating an exemplary configuration of a displacement measurement apparatus according to a first exemplary embodiment of the present invention.

FIG. 1 is a diagram illustrating an exemplary configuration of a displacement measurement apparatus 100 according to a first exemplary embodiment of the present invention. Referring to FIG. 1, the displacement measurement apparatus 100 includes a computer 110, a camera 120 connected with the computer 110 via a cable 121, and a vehicle detection device 130 wirelessly communicable with the computer 110.

The camera 120 is an image capturing device that captures an area 141 existing on a surface of a structure 140 whose displacement is to be measured, at a predetermined frame rate. In the present embodiment, the structure 140 is a bridge in which a road 150 such as a highway crosses over a river or the like. In order to simplify the description, it is assumed that the road 150 has one lane and that a vehicle travels from the right side to the left side of the sheet. In the present embodiment, the area 141 is a part of a floor system that is a diagnosis part of the bridge. However, the structure 140 is not limited to a bridge. The structure 140 may be an elevated structure of a road or a railroad. The size of the area 141 is several tens centimeters square, for example. The camera 120 is attached to a platform on a tripod (neither is illustrated) so as to allow the capturing direction of the camera to be fixed in any direction. The camera 120 may be a high-speed camera equipped with a charge-coupled device (CCD) image sensor or a complementary MOS (CMOS) image sensor having a pixel capacity of about several thousands pixels, for example. Further, the camera 120 may be a visible light and black and white camera or may be an infrared camera or a color camera. The camera 120 has a GPS sensor that measures the position of the camera. The camera 120 also has an azimuth sensor that measures the capturing direction of the camera and an acceleration sensor. The camera 120 is connected with the computer 110 via the cable 121, but may be connected with the computer 110 wirelessly.

The vehicle detection device 130 is configured to detect the size of a vehicle that passes through the structure 140, and detect the type of the vehicle from the size of the vehicle. The vehicle detection device 130 is configured to detect the position, the clock time, the speed, and the vehicle type of a vehicle that travels a pre-passage area 151 of the structure 140. The pre-passage area 151 means a road section that is passed by a vehicle before the vehicle passes through the structure 140. The section length of the pre-passage area 151 can be set arbitrarily. For example, the section length of the pre-passage area 151 may range from several tens meters to several kilometers. The vehicle detection device 130 is also configured to transmit vehicle detection data including the detected position, the clock time, the speed and the type of the vehicle to the computer 110 via a wireless network such as a mobile communication network.

The computer 110 is configured to acquire an image of the area 141 of the structure 140 captured by the camera 120 via the cable 121. The computer 110 is also configured to measure the deflection quantity of the area 141 of the structure 140 on the basis of an image acquired from the camera 120. The computer 110 is also configured to receive vehicle detection data transmitted from the vehicle detection device 130. The computer 110 is also configured to estimate the time when the vehicle arrives at the area 141 that is a measurement part of the structure 140 on the basis of the received vehicle detection data. The computer 110 is also configured to control the timing of acquiring an image of the area 141 by the camera 120, on the basis of the estimated arrival time.

The computer 110 is also configured to calculate a reference value to be used for calculating the weight of the vehicle whose weight is unknown and a reference value to be used for determining the soundness of the structure, on the basis of the deflection quantity of the area 141 generated by traveling of the vehicle. The computer 110 is also configured to calculate the weight of a vehicle, whose weight is unknown, traveling on the structure 140, by using the calculated reference value. The computer 110 is also configured to perform deterioration diagnosis of the structure 140 by using the calculated reference value.

FIG. 2 is a diagram illustrating an example of the vehicle detection device 130, in which the upper side is a plan view and the lower side is a side view.

A vehicle detection device 130-1 of this example includes a GPS sensor 1311, a speed sensor 1312, an acquisition unit 1313, a communication unit 1314, a light source 1315, an optical sensor 1316, and a vehicle type determination unit 1317, and is provided to the ground side of the pre-passage area.

The light source 1315 and the optical sensor 1316 are provided on the opposite sides of a road over the previously defined reference point. The distance from the reference point to the entrance of the structure 140 may be as short as about several tens meters, or as far as about several kilometers. The light source 1315 is configured to emit a light beam across the road at a predetermined height (for example, a half of an average vehicle height of a passenger car) from the road surface, toward the optical sensor 1316. The optical sensor 1316 is configured to receive and detect the light beam emitted from the light source 1315. During the time when the vehicle is passing through the reference point, the light beam emitted from the light source 1315 cannot reach the optical sensor 1316 because it is shielded by the vehicle, so that output of the optical sensor 1316 is off. On the other hand, in a period in which no vehicle passes through, the light beam of the light source 1315 is received by the optical sensor 1316, so that output of the optical sensor 1316 is on. Accordingly, the acquisition unit 1313 detects that the output of the optical sensor 1316 is changed from on to off, to thereby determine whether or not the head of a vehicle passes through the reference point. Further, immediately after the output of the optical sensor 1316 is changed from on to off, when the acquisition unit 1313 detects that the output of the optical sensor 1316 is changed again to off, the acquisition unit 1313 determines whether or not the tail of the vehicle passes through the reference point. The speed sensor 1312 is configured of a laser Doppler velocimeter or the like, and measures the speed of a vehicle passing through the reference point. The GPS sensor 1311 is a sensor that measures the position of the reference point and the current time. When measuring the position of the reference point, the GPS sensor 1311 is moved to the place of the reference point and measurement is performed. The acquisition unit 1313 inputs therein and stores the position of the reference point measured by the GPS sensor 1311.

Further, the acquisition unit 1313 acquires, from the GPS sensor 1311, the clock time of the point of time that the head of the vehicle passes through the reference point on the basis of the output of the optical sensor 1316. The acquired time is represented as ts. Further, the acquisition unit 1313 acquires, from the GPS sensor 1311, the clock time of the point of time that the tail of the vehicle passes through the reference point on the basis of the output of the optical sensor 1316. The acquired time is represented as te. Further, the acquisition unit 1313 acquires the speed of the vehicle when it passes through the reference point from the speed sensor 1312. The acquired speed is represented as v. Then, the acquisition unit 1313 inputs the time ts, the time te, and the speed v to the vehicle type determination unit 1317.

The vehicle type determination unit 1317 determines the type of the vehicle from the time ts, the time te, and the speed v. Specifically, the vehicle type determination unit 1317 calculates the entire length of the vehicle by multiplying the elapsed time from the time ts to the time te by the speed v. Then, the vehicle type determination unit 1317 compares the calculated entire length with a threshold th registered and stored in advance, and when the entire length≥th is established, the vehicle type determination unit 1317 determines that the vehicle is a heavy vehicle. Meanwhile, when the entire length<th is established, the vehicle type determination unit 1317 determines that the vehicle is not a heavy vehicle. As the threshold th, a value (for example, 5 m, 6 m, 7 m, or the like) that is larger than the maximum length (4.7 m) of a small-sized truck and is smaller than the maximum length (12 m) of a medium or large-sized truck is used. Thereby, the vehicle type determination unit 1317 determines whether the vehicle is a heavy vehicle including a medium or large-sized truck or a non-heavy vehicle other than that. The vehicle type determination unit 1317 notifies the acquisition unit 1313 of the determined vehicle type.

Further, the acquisition unit 1313 is configured to generate vehicle detection data including the time is (or time te), the speed v, the position of the reference point stored in advance, and the vehicle type determined by the vehicle type determination unit 1317. The communication unit 1314 is configured to transmit the vehicle detection data generated by the acquisition unit 1313 to the computer 110 via a wireless network such as a mobile communication network. The acquisition unit 1313, the communication unit 1314, and the vehicle type determination unit 1317 can be realized by a computer and a program, for example.

FIG. 3 is a block diagram illustrating another example of the vehicle detection device 130. A vehicle detection device 130-2 of this example includes a GPS sensor 1321, a speed sensor 1322, an acquisition unit 1323, a communication unit 1324, a light source 1325, and an optical sensor 1326, and is provided to the ground side of the pre-passage area.

The light source 1325 and the optical sensor 1326 are provided on the opposite sides of a road over the previously defined reference point. The distance from the reference point to the entrance of the structure 140 may be as short as about several tens meters, or as far as about several kilometers. The light source 1325 is configured to emit a light beam across the road at a predetermined height from the road surface, toward the optical sensor 1326. Here, the height at which the light source 1325 is provided, that is, a height H of the light beam from the road surface, differs from that of the vehicle detection device 130-1 in FIG. 2. In the vehicle detection device 130-2, the height H of the light beam from the road surface is set to a value (for example, 2.5 m, 3 m, or the like) that is higher than the maximum height 2 m of the small-sized truck and is lower than the maximum height 3.8 m of the medium or large-sized truck. The optical sensor 1326 is configured to receive and detect the light beam emitted from the light source 1325. In a period in which no vehicle passes through the reference point or a period in which a vehicle whose entire height is lower than H, such as a small-sized truck, passes through the reference point, a light beam from the light source 1325 is received by the optical sensor 1326, so that output of the optical sensor 1326 is on. On the other hand, during the time that a medium or large-sized truck whose height is higher than H is passing through the reference point, the light beam emitted from the light source 1325 cannot reach the optical sensor 1326 because it is shielded by the vehicle, so that output of the optical sensor 1326 is off. Accordingly, by detecting that the output of the optical sensor 1326 is changed from on to off, the acquisition unit 1323 can determine whether or not the a medium or large-sized truck whose entire height is higher than H passes through the reference point. That is, in the vehicle detection device 130-2, the acquisition unit 1323 has the function of a vehicle type determination unit. The speed sensor 1322 is configured of a laser Doppler velocimeter or the like, and measures the speed of a vehicle passing through the reference point. The GPS sensor 1321 is a sensor that measures the position of the reference point and the current clock time. When measuring the position of the reference point, the GPS sensor 1321 is moved to the place of the reference point and measurement is performed. The acquisition unit 1323 inputs therein and stores the position of the reference point measured by the GPS sensor 1321.

Further, the acquisition unit 1323 acquires, from the GPS sensor 1321, the clock time of the point of time that a medium or large-sized truck whose entire height is higher than H passes through the reference point, on the basis of the output of the optical sensor 1316. The acquired time is represented as ts. Further, the acquisition unit 1323 acquires, from the speed sensor 1322, the speed of the vehicle when the medium or large-sized truck whose entire height is higher than H passes through the reference point. The acquired speed is represented as v. Further, the acquisition unit 1323 is configured to generate vehicle detection data including the time ts, the speed v, the position of the reference point stored in advance, and the vehicle type indicating that it is a heavy vehicle. The communication unit 1324 is configured to transmit the vehicle detection data generated by the acquisition unit 1323 to the computer 110 via a wireless network such as a mobile communication network. The acquisition unit 1323 and the communication unit 1324 can be realized by a computer and a program, for example.

Figure 4:
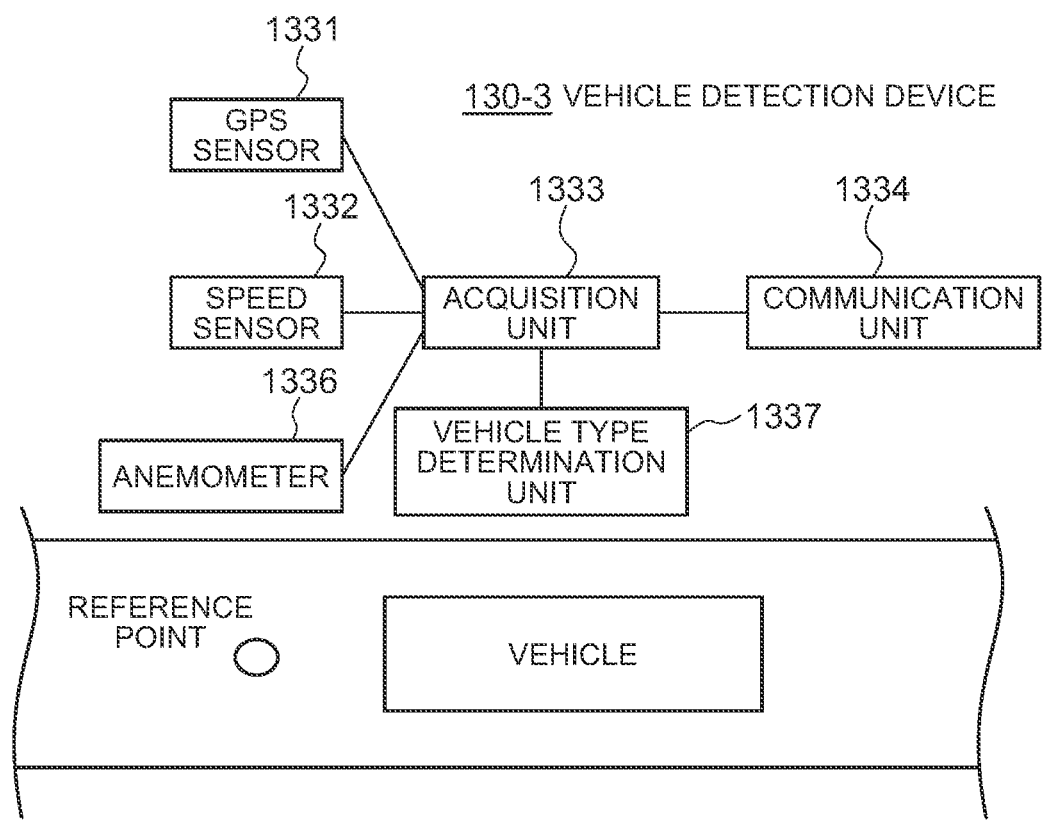
FIG. 4 is a diagram illustrating still another example of a vehicle detection device in the displacement measurement apparatus according to the first exemplary embodiment of the present invention.

FIG. 4 is a block diagram illustrating an example of the vehicle detection device 130. A vehicle detection device 130-3 of this example includes a GPS sensor 1331, a speed sensor 1332, an acquisition unit 1333, a communication unit 1334, and an anemometer 1336, and is provided on the ground side of the pre-passage area.

The anemometer 1336 is provided beside the road near the reference point. The distance from the reference point to the entrance of the structure 140 may be as short as about several tens meters, or as far as about several kilometers. When a vehicle passes through the road, wind is generated beside the road. Hereinafter, the wind generated by the passage of a vehicle is referred to as vehicle wind. At the head portion of the vehicle, vehicle wind (hereinafter referred to as primary vehicle wind) that pushes away the surrounding air is generated, and at the rear portion of the vehicle, vehicle wind (hereinafter referred to as secondary vehicle wind) that is flown from the rear and the sides to fill the portion where the pressure is lowered is generated. When the passing vehicle is a vehicle having a small volume such as a passenger car or a small-sized truck, it is difficult to observe the vehicle wind beside the road. However, in the case of a vehicle having a large volume such as a medium or large-sized truck, large-scale vehicle wind is generated, which can be easily observed beside the road. The anemometer 1336 is provided at a place where vehicle wind generated by such a medium or large-sized truck can be measured. The acquisition unit 1333 is configured to determine that a medium or large-sized truck has passed through the reference point when detecting the vehicle wind measured by the anemometer 1336. That is, in the vehicle detection device 130-3, the acquisition unit 1333 has a function of a vehicle type determination unit. For example, the acquisition unit 1333 is configured to monitor change patterns of the strength (wind speed) and direction of the wind measured by the anemometer 1336, and detect identical or similar change patterns of the vehicle wind that is registered and stored in advance, to thereby determine that a medium or large-sized truck has passed through the reference point. However, the method of detecting the vehicle wind is not limited to that described above. For example, when the sides of a road including the reference point is surrounded by a windbreak wall and an influence of natural wind can be disregarded, the acquisition unit 1333 may determine whether or not a medium or large-sized truck has passed according to whether or not the strength of the wind measured by the anemometer 1336 exceeds a threshold set and stored in advance. Further, there is some delay from the time when a vehicle has passed through the reference point until vehicle wind is generated beside the road of the reference point. Therefore, the anemometer 1336 may be provided beside the road in front of the reference point, or in the case where the anemometer 1336 is provided beside the road of the reference point, clock time that is before the clock time that the vehicle wind has been detected by a certain period of time, may be set as a vehicle passage time. The speed sensor 1322 is configured of a laser Doppler velocimeter or the like, and measures the speed of a vehicle passing through the reference point. The GPS sensor 1331 is a sensor that measures the position of the reference point and the current clock time. When measuring the position of the reference point, the GPS sensor 1331 is moved to the place of the reference point and measurement is performed. The acquisition unit 1333 inputs therein and stores the position of the reference point measured by the GPS sensor 1331.

The acquisition unit 1323 acquires, from the GPS sensor 1331, the clock time of the point of time that a medium or large-sized truck passes through the reference point, on the basis of output of the anemometer 1336. The acquired time is represented as ts. Further, the acquisition unit 1333 acquires, from the speed sensor 1322, the speed of the vehicle when the medium or large-sized truck passes through the reference point. The acquired speed is represented as v. Further, the acquisition unit 1333 is configured to generate vehicle detection data including the time ts, the speed v, the position of the reference point stored in advance, and the vehicle type indicating that it is a heavy vehicle. The communication unit 1334 is configured to transmit the vehicle detection data generated by the acquisition unit 1333 to the computer 110 via a wireless network such as a mobile communication network. The acquisition unit 1333 and the communication unit 1334 can be realized by a computer and a program, for example.

Exemplary configurations of the vehicle detection device 130 have been described above. Next, an exemplary configuration of the computer 110 will be described.

Figure 5:
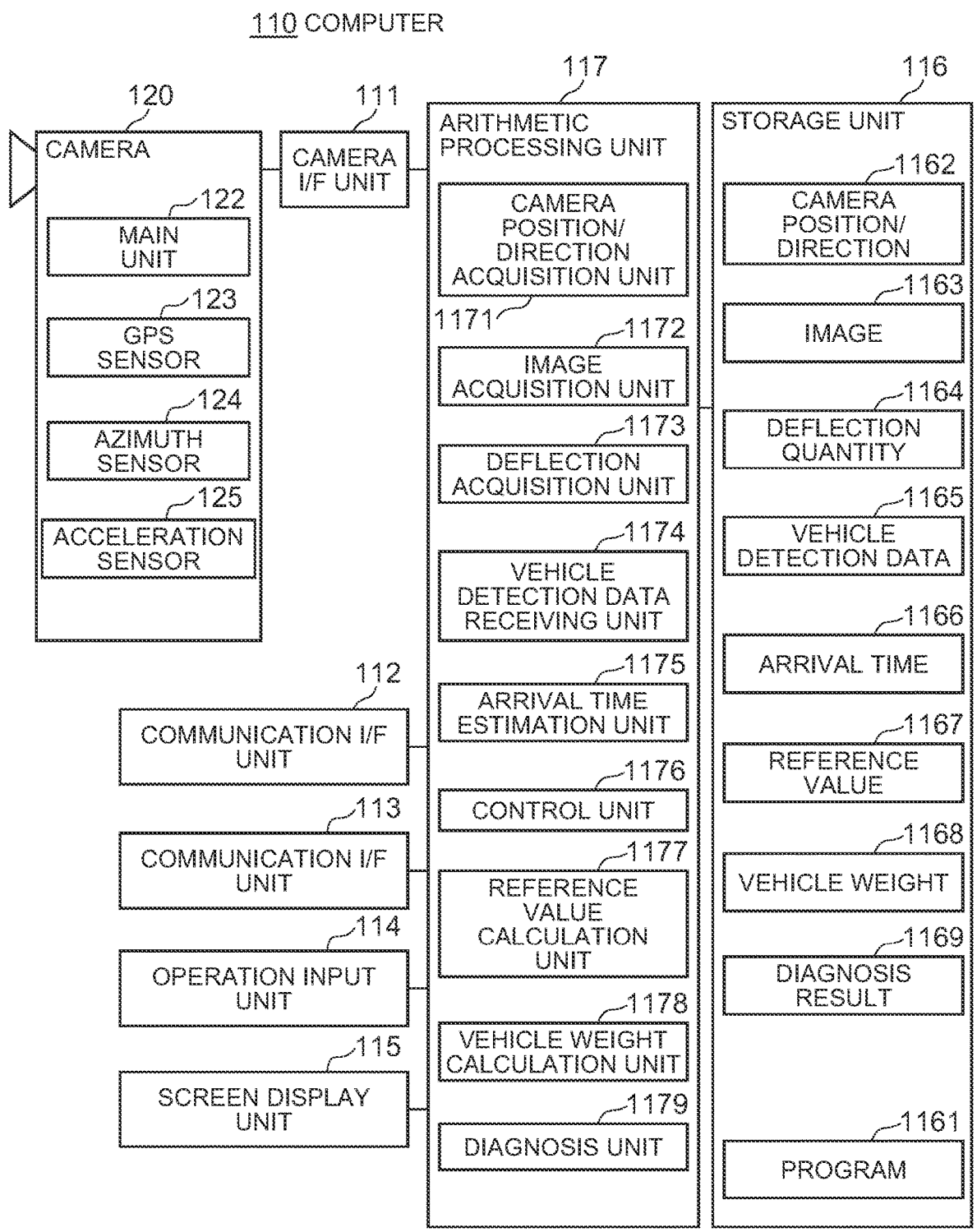
FIG. 5 is a block diagram illustrating an exemplary configuration of a computer in the displacement measurement apparatus according to the first exemplary embodiment of the present invention.

FIG. 5 is a block diagram illustrating an exemplary configuration of the computer 110. Referring to FIG. 5, the computer 110 includes a camera interface (I/F) unit 111, communication I/F units 112 and 113, an operation input unit 114, a screen display unit 115, a storage unit 116, and an arithmetic processing unit 117.

The camera I/F unit 111 is connected to the camera 120 via the cable 121. The camera 120 has a main unit 122 including an image sensor, an optical system, and the like, and the GPS sensor 123, the azimuth sensor 124, and the acceleration sensor 125 described above. The camera IN unit 111 is configured to perform data transmission and reception between the main unit 122, the GPS sensor 123, the azimuth sensor 124, and the acceleration sensor 125, and the arithmetic processing unit 117.

The communication I/F unit 112 is configured of a data communication circuit, and is configured to perform data communication with the vehicle detection device 130 via a wireless network such as a mobile communication network. The communication I/F unit 113 is configured of a data communication circuit, and is configured to perform data communication with an external device, not shown, via wired or wireless communication. The operation input unit 114 includes operation input devices such as a keyboard and a mouse, and is configured to detect an operation by an operator and output it to the arithmetic processing unit 117. The screen display unit 115 is configured of a screen display device such as a liquid crystal display (LCD), and is configured to display, on a screen, various types of information such as a processing result according to an instruction from the arithmetic processing unit 117.

The storage unit 116 is configured of storage devices such as a hard disk and a memory, and is configured to store therein processing information and a program 1161 necessary for various types of processing in the arithmetic processing unit 117. The program 1161 is a program for implementing various processing units by being read and executed by the arithmetic processing unit 117, and is read in advance from an external device or a storage medium via a data input-output function of the communication I/F unit 113 and is stored in the storage unit 116. The main processing information to be stored in the storage unit 116 includes a camera position/direction 1162, an image 1163, deflection quantity 1164, the vehicle detection data 1165, arrival time 1166, a reference value 1167, vehicle weight 1168, and a diagnosis result 1169.

The camera position/direction 1162 includes position data representing the installation position of the camera 120 and capturing direction data representing the capturing direction. For example, the position data includes longitude, latitude, and height representing the position of the camera 120 measured by the GPS sensor 123. The capturing direction data is data representing the capturing direction of the camera 120 calculated on the basis of data measured by the azimuth sensor 124 and the acceleration sensor 125 provided to the camera 120. The capturing direction is configured of three angles of pitch, roll, and yaw representing the posture of the camera 120.

The image 1163 is time-series images captured by the camera 120 for detecting the deflection quantity. The image 1163 may be a plurality of frame images constituting the moving image of the area 141 of the structure 140 captured by the camera 120. Each frame image has a captured time attached thereto.

Figure 6:
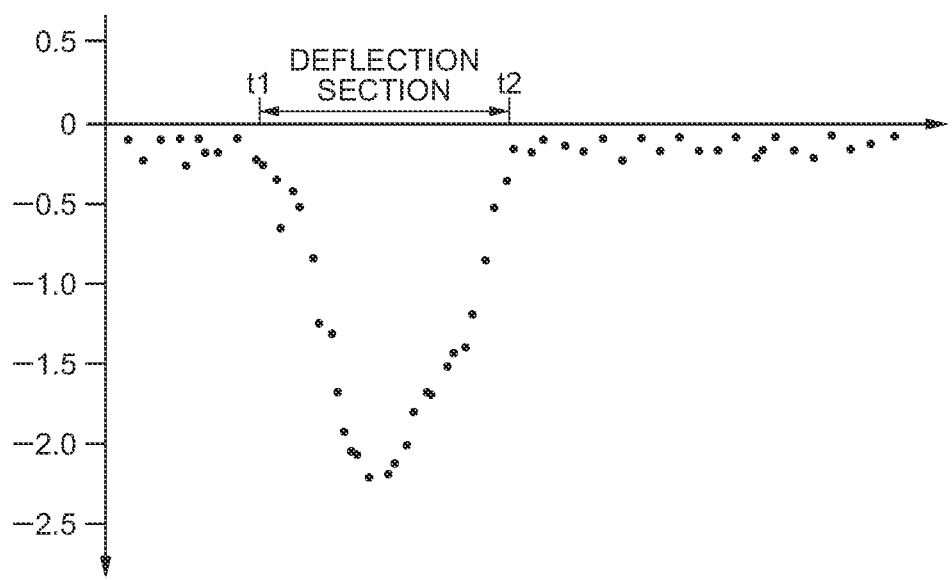
FIG. 6 illustrates an example of time-series data of the deflection quantity measured by the displacement measurement apparatus according to the first exemplary embodiment of the present invention.

The deflection quantity 1164 is time-series data representing the deflection quantity generated in the area 141 of the structure 140 by the weight of the vehicle that travels on the structure 140. The deflection quantity 1164 is generated based on the image 1163. The deflection quantity 1164 includes the acquisition time (measurement time) and a value of the deflection quantity. FIG. 6 illustrates exemplary time-series data of the deflection quantity 1164. In the graph of FIG. 6, the vertical axis represents the deflection quantity (mm) and the horizontal axis represents the time. Each dot in the graph represents a value of the deflection quantity at a clock time. The example illustrated in FIG. 6 shows a temporal change of the deflection quantity in the area 141 when one vehicle passes through on the structure 140. As illustrated in FIG. 6, in the situation where one vehicle passes through on the structure 140, a tendency as described below is shown. That is, the structure 140 begins to deflect at time t1 when the vehicle enters the structure 140, and the deflection quantity becomes maximum at the time when the vehicle travels almost immediately above the area 141, and then the deflection quantity gradually decreases and returns to zero again after time t2 that is the time when the vehicle exits the structure 140. A section from the time t1 to the time t2 during which deflection is generated as described above is called a deflection section. The deflection section can be detected as a section in which the deflection quantity becomes a threshold or larger, for example. Note that since the measured deflection includes micro vibration, general contrivance such as a use of a low-pass filter may be applied. That is, it is possible to apply a low-pass filter by considering a polygonal line connecting the dots in the time order as a signal waveform. Alternatively, it is possible to replace it with an approximate curve that makes the square error of a distance from the deflection quantity represented by dots minimum.

The vehicle detection data 1165 is data including the position, the clock time, the vehicle speed, and the vehicle type of the vehicle detected by the vehicle detection device 130.

The arrival time 1166 is the clock time that the vehicle arrives at the area 141 that is the measurement part of the structure 140. The arrival time 1166 is calculated based on the vehicle detection data 1165.

The reference value 1167 is a deflection quantity of the structure 140 per unit weight. The reference value 1167 is equivalent to $\delta/M$, where M represents the vehicle weight applied to the area 141 of the structure 140, and $\delta$ represents the deflection quantity of the area 141 at that time. Such a reference value is constant in a short period. Therefore, by using such a value, it is possible to calculate the weight of the vehicle that travels on the structure 140. Moreover, since the reference value as described above increases in the long term due to aging deterioration of the floor system constituting the structure 140, by using the value, it is possible to perform deterioration diagnosis of the structure 140. Note that the reference value 1167 is not limited to the aforementioned example. The reference value 1167 may be a coefficient specifying any relational expression established between the vehicle weight applied to the structure 140 and the deflection quantity. Further, the reference value 1167 is applied with a time stamp showing the calculated date and time.

The vehicle weight 1168 is data representing the estimated weight of the vehicle whose weight is unknown, calculated by using the reference value 1167.

The diagnosis result 1169 is data representing the result of deterioration diagnosis of the structure 140 performed by using the reference value 1167. The diagnosis result 1169 includes ID specifying the structure 140 to be diagnosed and the area 141, presence or absence of deterioration, diagnosis date/time, and the like.

The arithmetic processing unit 117 has a processor such as an MPU and the peripheral circuits, and is configured to read and execute the program 1161 from the storage unit 116 to allow the hardware and the program 1161 to cooperate with each other to thereby implement the various processing units. Main processing units implemented by the arithmetic processing unit 117 include a camera position/direction acquisition unit 1171, an image acquisition unit 1172, a deflection acquisition unit 1173, a vehicle detection data receiving unit 1174, an arrival time estimation unit 1175, a control unit 1176, a reference value calculation unit 1177, a vehicle weight calculation unit 1178, and a diagnosis unit 1179.

The camera position/direction acquisition unit 1171 is configured to acquire the position of the camera 120 measured by the GPS sensor 123 through the camera I/F unit 111. The camera position/direction acquisition unit 1171 is also configured to acquire the azimuth angle and the acceleration in three directions namely length, width, and height, measured by the azimuth sensor 124 and the acceleration sensor 125 via the camera I/F unit 111, and calculate the capturing direction represented by the posture of the camera 120, that is, three angles namely pitch, roll, and yaw, from the acquired azimuth angle and the acceleration. Further, the camera position/direction acquisition unit 1171 is configured to store the acquired camera position and the calculated capturing direction in the storage unit 116 as the camera position/direction 1162.

The image acquisition unit 1172 is configured to acquire time-series images captured by the camera 120 via the camera I/F unit 111, and store the captured time-series images in the storage unit 116 as the image 1163.

The deflection acquisition unit 1173 is configured to acquire, in a time-series manner, the deflection quantity generated in the area 141 of the structure 140 by the weight of the vehicle that travels on the structure 140, on the basis of the image 1163 stored in the storage unit 116, and store the acquired time-series data of the deflection quantity in the storage unit 116 as the deflection quantity 1164. For example, the deflection acquisition unit 1173 reads all of the images 1163 stored in the storage unit 116, and measures a temporal change in the deflection quantity of the surface of the structure 140 from each of the images. For example, in the case of capturing the floor system of a bridge from a lower direction by the camera 120, a capturing distance H from the camera to the floor system is decreased by the deflection quantity $\delta$ generated in the floor system of the bridge by the vehicle weight. Therefore, the captured image is expanded with the optical axis of the camera being the center, and an apparent displacement $\delta i$ caused by the deflection occurs. A relationship $\delta_i = yf\{1/(H-\delta)-1/H\}$ is established, where H represents the capturing distance, $\delta_i$ represents displacement, $\delta$ represents the deflection quantity, y represents the distance from the optical axis of the camera at the displacement calculation position, and f represents the focus distance of the camera. Therefore, by detecting the displacement $\delta_i$ of each frame image by a digital image correlation method, it is possible to calculate the deflection quantity of the surface of the structure 140 of each frame image from the aforementioned expression. Note that the capturing distance H can be measured in advance by a laser range finder for example, and the distance y can be calculated from the displacement calculation position of the image and the optical axis of the camera, and f is known for each capturing device.

The vehicle detection data receiving unit 1174 is configured to receive, via the communication I/F unit 112, vehicle detection data transmitted from the vehicle detection device 130, and store it in the storage unit 116 as the vehicle detection data 1165.

The arrival time estimation unit 1175 is configured to estimate the clock time when the vehicle arrives at the area 141 that is a measurement part of the structure 140, on the basis of the vehicle detection data 1165 stored in the storage unit 116. The arrival time estimation unit 1175 estimates the arrival time t according to the following expression:

$$t = t_b + [(x_b, y_b) - (x_t, y_t)]/v \qquad (1)$$

In Expression 1, $x_b$ and $y_b$ represent the longitude and the latitude of the vehicle, $t_b$ represents the clock time when the vehicle stays at the position of the longitude and the latitude, and v represents the speed of the vehicle, which are included in the vehicle detection data 1165. Further, in Expression 1, $x_t$ and $y_t$ represent the longitude and the latitude of the area 141. The arrival time estimation unit 1175 is configured to calculate the longitude and the latitude of the area 141 by the method that is the same as the triangulation, from the longitude and the latitude of the camera 120 included in the camera position/direction 1162 stored in the storage unit 116, the capturing direction of the camera 120, and the distance between the camera 120 and the area 141 acquired and stored in advance. Further, $[(x_b, y_b) - (x_t, y_t)]$ represents a linear distance from the position of the longitude $x_t$ and the latitude $y_t$ to the position of the longitude $x_b$ to the latitude $y_b$.

However, the method of estimating the arrival time is not limited to the method described above. For example, the arrival time estimation unit 1175 may use the default speed $v_d$ having been set and stored in advance, instead of the speed v of the vehicle in Expression 1. According to this method, arrival time can be estimated even when the vehicle speed cannot be detected on the vehicle detection device 130 side.

The arrival time estimation unit 1175 may also use longitude $x_e$ and latitude $y_e$ of the camera 120, instead of the longitude $x_t$ and the latitude $y_t$ of the area 141 in Expression 1. By this method, the arrival time can be estimated easily in the case where the camera 120 is installed almost immediately below the area 141.

The arrival time estimation unit 1175 is configured to store the arrival time, calculated by the method described above, in the storage unit 116 as the arrival time 1166.

The control unit 1176 is configured to control the timing of acquiring an image of the area 141 by the camera 120, on the basis of the arrival time 1166 stored in the storage unit 116 and the vehicle type in the vehicle detection data 1165 used for calculating the arrival time 1166. For example, when the vehicle type is a heavy vehicle, the control unit 1176 determines to acquire an image of the area 141 by the camera 120, while when the vehicle type is a non-heavy vehicle, the control unit 1176 determines not to acquire an image by the camera 120. Further, the control unit 1176 is configured to, when acquiring an image, calculate an error in the arrival time 1166, and during the period from the time before the arrival time 1166 by the error to the time after the arrival time 1166 by the error, control the image acquisition unit 1172 to continuously acquire images. An estimated error may be a certain percentage of the difference between the current time and the arrival time 1166, for example. Further, a certain percentage may be a value corresponding to the estimated accuracy of the arrival time estimation method. That is, when the estimation accuracy is low as in the case of an estimation method using the default speed, the certain percentage is set to be larger, while when the estimation accuracy is high as in the case of an estimation method using detected vehicle speed, the value of the certain percentage is set to be smaller. However, the control method is not limited to that described above. For example, the control unit 1176 may allow the image acquisition unit 1172 to perform the acquisition during the period from the time before the arrival time 1166 by a certain period of time to the time after the arrival time 1166 by a certain period of time.

The reference value calculation unit 1177 is configured to calculate the reference value 1167 on the basis of the deflection quantity 1164 stored in the storage unit 116 and a vehicle weight given, and store the calculated value in the storage unit 116.

The vehicle weight calculation unit 1178 is configured to calculate the weight of a vehicle, whose weight is unknown, traveling on the structure 140, on the basis of the reference value 1167 stored in the storage unit 116. Further, the vehicle weight calculation unit 1178 is configured to store the calculated weight in the storage unit 116 as the vehicle weight 1168.

The diagnosis unit 1179 is configured to diagnose deterioration of the structure 140, on the basis of the reference value 1167 stored in the storage unit 116. Further, the diagnosis unit 1179 is configured to store the diagnosis result in the storage unit 116 as the diagnosis result 1169.

Figure 7:
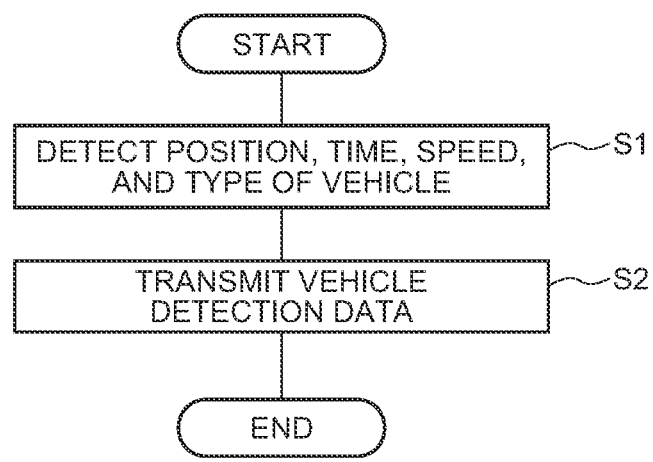
FIG. 7 is a flowchart illustrating an exemplary operation of a vehicle detection device in the displacement measurement apparatus according to the first exemplary embodiment of the present invention.
Figure 8:
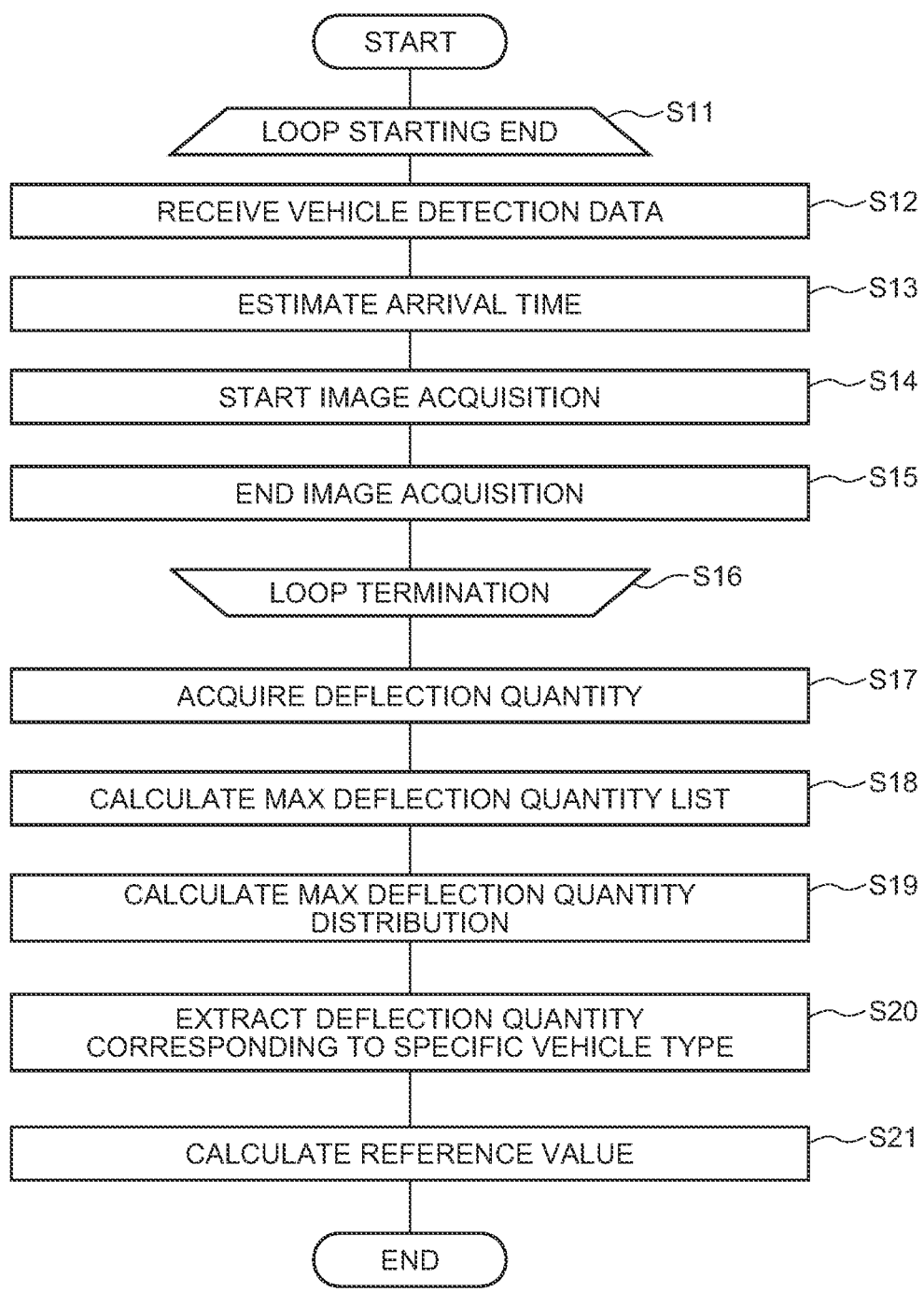
FIG. 8 is a flowchart illustrating an exemplary operation of calculating a reference value by a computer in the displacement measurement apparatus according to the first exemplary embodiment of the present invention.

The exemplary configuration of the computer 110 has been described. Next, operation of the displacement measurement apparatus 100 will be described. Operation of the displacement measurement apparatus 100 is divided into the following three categories:

(1) Calculation of reference value
(2) Measurement of weight of a vehicle whose weight is unknown
(3) Deterioration diagnosis of structure (1) Calculation of Reference Value First, an operation of calculating the reference value 1167 will be described. FIGS. 7 and 8 are flowcharts illustrating exemplary operations of the vehicle detection device 130 and the computer 110 in the displacement measurement apparatus 100 when calculating a reference value according to the travel of an inspection vehicle.

An operator installs a measurement device group including the computer 110 and the camera 120, and the vehicle detection device 130 on site, and when preparation for calculating a reference value has been set, the operator operates the vehicle detection device 130 and also inputs a reference value calculation instruction from the operation input unit 114 to the computer 110. Then, the vehicle detection device 130 starts the processing illustrated in FIG. 7, and the computer 110 starts the processing illustrated in FIG. 8.

<Operation of Vehicle Detection Device 130>

The vehicle detection device 130 detects the position, the clock time, the speed, and the vehicle type of a vehicle that travels the pre-passage area 151 of the structure 140 on the road 150 (step S1). Then, the vehicle detection device 130 transmits the vehicle detection data including the detected position, clock time, speed, and vehicle type of the vehicle, to the computer 110 (step S2).

For example, in the case of the vehicle detection device 130-1 illustrated in FIG. 2, the acquisition unit 1313 determines whether or not the vehicle has passed through the reference point on the basis of an output from the optical sensor 1316, and upon detection of the passage, acquires, from the GPS sensor 1311, the clock time of the point of time, and also acquires the speed of the vehicle from the speed sensor 1312, and generates vehicle detection data together with the position of the reference point having been measured by the speed sensor 1311 in advance, and the vehicle type determined by the vehicle type determination unit 1317, and transmits it to the computer 110. The vehicle detection device 130-3 performs the above-described operation for each vehicle that passes through the reference point.

Further, in the case of the vehicle detection device 130-2 illustrated in FIG. 3, the acquisition unit 1323 determines whether or not the medium or large-sized truck has passed through the reference point on the basis of an output from the optical sensor 1326, and upon detection of the passage, acquires, from the GPS sensor 1321, the clock time of the point of time, and also acquires the speed of the vehicle from the speed sensor 1322, and generates vehicle detection data together with the position of the reference point having been measured by the GPS sensor 1321 in advance and the vehicle type indicating that it is a heavy vehicle, and transmits it to the computer 110. The vehicle detection device 130-2 performs the above-described operation for each vehicle that passes through the reference point.

Further, in the case of the vehicle detection device 130-3 illustrated in FIG. 4, the acquisition unit 1333 determines whether or not a medium or large-sized truck has passed through the reference point on the basis of the wind speed measured by the anemometer 1336, and upon detection of the passage, acquires, from the GPS sensor 1331, the clock time of the point of time, and also acquires the speed of the vehicle from the speed sensor 1332, and generates vehicle detection data together with the position of the reference point having been measured by the GPS sensor 1331 in advance and the vehicle type indicating that it is a heavy vehicle, and transmits it to the computer 110. The vehicle detection device 130-3 performs the above-described operation for each vehicle that passes through the reference point.

<Operation of Computer 110>

The vehicle detection data receiving unit 1174 of the computer 110 repeatedly performs steps S12 to S15 for a certain period of time (steps S11, S16). The certain period of time may be any period if it is sufficient for acquiring statistical information. For example, a certain period of time may be several hours or one day, but is not limited thereto.

At step S12, the vehicle detection data receiving unit 1174 receives, via the communication I/F unit 112, vehicle detection data from the vehicle detection device 130, and stores it in the storage unit 116 as the vehicle detection data 1165. At step S13, when the vehicle type is a heavy vehicle, the arrival time estimation unit 1175 estimates the time when the vehicle arrives at the area 141 according to Expression 1 described above, on the basis of the vehicle detection data 1165 stored in the storage unit 116, and stores it in the storage unit 116 as the arrival time 1166. At step S14, when the vehicle type is a heavy vehicle, the control unit 117 calculates the start time and the end time of image capturing, on the basis of the arrival time 1166 stored in the storage unit 116, and when the start time of image capturing comes, the control unit 1176 allows the image acquisition unit 1172 to acquire images. The image acquisition unit 1172 acquires images of the camera 120 at a predetermined frame rate via the camera I/F unit 111, and stores them in the storage unit 116 as the images 1163. At this point of time or a previous point of time, the camera position/direction acquisition unit 1171 acquires detection results of the GPS sensor 123, the azimuth sensor 124, and the acceleration sensor 125, via the camera I/F unit 111, and stores them in the storage unit 116 as the camera position/direction 1162. At step S15, when the end time of image acquisition arrives, the control unit 1176 allows the image acquisition unit 1172 to end image acquisition.

Then, the deflection acquisition unit 1173 acquires time-series data of the deflection quantity at the area 141 of the structure 140 on the basis of the images 1163 stored in the storage unit 116, and stores it in the storage unit 116 as the deflection quantity 1164 (step S17).

Then, the reference value calculation unit 1177 performs the processing described below to calculates the reference value 1167, and stores it in the storage unit 116. First, the reference value calculation unit 1177 detects all of the deflection sections from the deflection quantity 1164 stored in the storage unit 116, and for each deflection section, calculates a maximum value of the deflection quantity, and create a list of the maximum values of the deflection quantity (step S18). Then, the reference value calculation unit 1177 generates distribution of the maximum values of the deflection quantity described in the list (step S19). For example, the reference value calculation unit 1177 generates a list in which the maximum values of the deflection quantity are in the ascending order, as distribution. Alternatively, the reference value calculation unit 1177 generates a histogram in which the maximum values of the deflection quantity are sectioned by the class and the appearance frequency for each class is put into a graph.

Then, the reference value calculation unit 1177 extracts the deflection quantity corresponding to a specific vehicle type from the distribution (step S20). For example, when the specific vehicle type is a large-sized vehicle, since the deflection quantity by a large-sized vehicle appears on the upper side of the distribution, the reference value calculation unit 1177 extracts the deflection quantity corresponding to the large-sized vehicle from the upper distribution of displacement quantity in the distribution.

Then, the reference value calculation unit 1177 calculates a reference value on the basis of the extracted deflection quantity and the weight of the specific vehicle type provided and stored in advance (step S21). For example, when the specific vehicle type is a large-sized vehicle, the reference value calculation unit 1177 calculates a reference value by dividing the extracted deflection quantity by the vehicle weight of the large-sized vehicle.

(2) Measurement of Weight of Vehicle Whose Weight is Unknown

Figure 9:
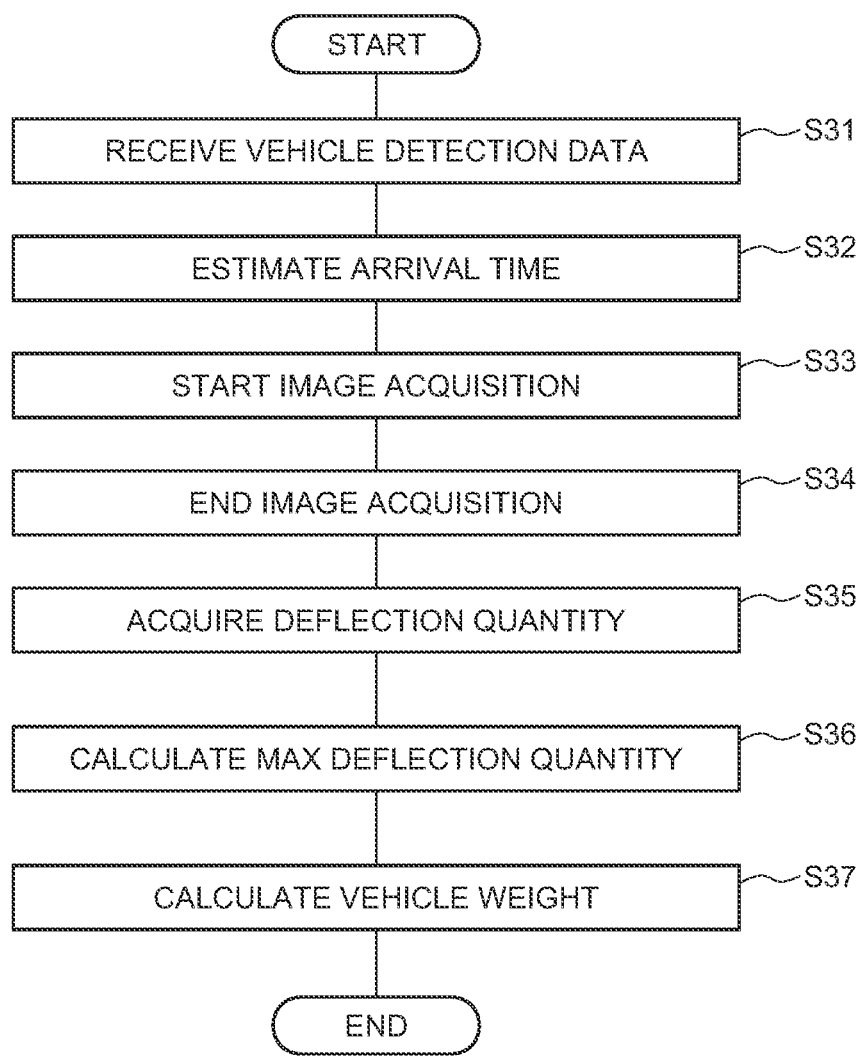
FIG. 9 is a flowchart illustrating an exemplary operation of calculating the weight of a vehicle whose weight is unknown, by a computer in the displacement measurement apparatus according to the first exemplary embodiment of the present invention.

Next, an operation of measuring the weight of a vehicle whose weight is unknown, traveling on the structure 140, will be described. Note that measurement of the weight of a vehicle whose weight is unknown is performed using the latest reference value 1167 measured in (1). FIG. 9 is a flowchart illustrating an exemplary operation of the computer 110 when measuring the weight of a vehicle.

An operator installs a measurement device group including the computer 110 and the camera 120, and the vehicle detection device 130 on site, and when preparation for calculating a reference value is set, the operator operates the vehicle detection device 130 and also inputs an instruction for measuring the vehicle weight from the operation input unit 114 to the computer 110. Then, the vehicle detection device 130 starts the processing illustrated in FIG. 7, and the computer 110 starts the processing illustrated in FIG. 9.

<Operation of Vehicle Detection Device 130>

Operation of the vehicle detection device 130 for measuring the vehicle weight is basically the same as the operation for calculating the reference value. The vehicle detection device 130 detects the position, the clock time, the speed, and the vehicle type of a vehicle that travels the pre-passage area 151 of the structure 140 on the road 150 (step S1). Then, the vehicle detection device 130 transmits the vehicle detection data including the detected position, clock time, speed, and vehicle type of the vehicle, to the computer 110 (step S2).

<Operation of Computer 110>

When the vehicle detection data receiving unit 1174 of the computer 110 receives vehicle detection data from the vehicle detection device 130 via the communication I/F unit 112, the vehicle detection data receiving unit 1174 stores it in the storage unit 116 as the vehicle detection data 1165 (step S31). Then, when the vehicle type is a heavy vehicle, the arrival time estimation unit 1175 estimates the time that the vehicle arrives at the area 141 according to Expression 1 described above, on the basis of the vehicle detection data 1165 stored in the storage unit 116, and stores it in the storage unit 116 as the arrival time 1166 (step S32). Then, when the vehicle type is a heavy vehicle, the control unit 117 calculates the start time and the end time of image capturing, on the basis of the arrival time 1166 stored in the storage unit 116, and when the start time of image capturing comes, the control unit 1176 allows the image acquisition unit 1172 to acquire images (step S33). The image acquisition unit 1172 acquires images of the camera 120 at a predetermined frame rate via the camera I/F unit 111, and stores them in the storage unit 116 as the images 1163. At this point of time or a previous point of time, the camera position/direction acquisition unit 1171 acquires detection results of the GPS sensor 123, the azimuth sensor 124, and the acceleration sensor 125, via the camera I/F unit 111, and stores them in the storage unit 116 as the camera position/direction 1162.

When the time to end image acquisition comes, the control unit 1176 allows the image acquisition unit 1172 to end image acquisition (step S34). Then, the deflection acquisition unit 1173 acquires time-series data of the deflection quantity at the area 141 of the structure 140 on the basis of the images 1163 stored in the storage unit 116, and stores it in the storage unit 116 as the deflection quantity 1164 (step S35). Then, the vehicle weight calculation unit 1178 extracts the maximum value of the deflection quantity from the deflection quantity 1164 stored in the storage unit 116 (step S36). Then, the vehicle weight calculation unit 1178 calculates the weight of the vehicle by dividing the maximum value of the deflection quantity by the reference value, and stores it in the storage unit 116 as the vehicle weight 1168 (step S37). The vehicle weight calculation unit 1178 may display the calculated vehicle weight on the screen display unit 115 or/and transmit it to an external terminal via the communication I/F unit 113. Alternatively, the vehicle weight calculation unit 1178 may compare the calculated vehicle weight 1168 with the maximum weight of a vehicle allowed to travel on the structure 140, and when the vehicle weight 1168 exceeds the maximum weight, the vehicle weight calculation unit 1178 may display an alert on the screen display unit 115 or/and transmit an alert message to an external device via the communication I/F unit 113.

(3) Deterioration Diagnosis of Structure

Figure 10:
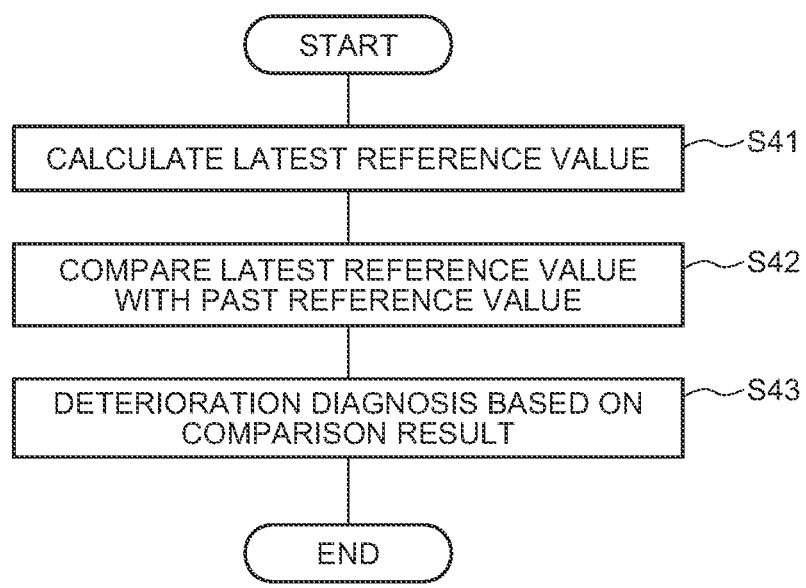
FIG. 10 is a flowchart illustrating an exemplary operation of performing deterioration diagnoses of a structure by a computer in the displacement measurement apparatus according to the first exemplary embodiment of the present invention.

Next, an operation of performing deterioration diagnosis of the structure 140 will be described. Deterioration diagnosis of the structure 140 is performed through comparison between the past reference value 1167 measured and stored in (1) and the latest reference value acquired at the time of diagnosis. FIG. 10 is a flowchart illustrating an exemplary operation of the computer 110 when performing deterioration diagnosis of the structure 140.

An operator installs a measurement device group including the computer 110 and the camera 120, and the vehicle detection device 130 on site, and when preparation for allowing an inspection vehicle to travel of the structure 140 is set, the operator operates the vehicle detection device 130 and also inputs an instruction for deterioration diagnosis from the operation input unit 114 to the computer 110. Then, the vehicle detection device 130 starts the processing illustrated in FIG. 7, and the computer 110 starts the processing illustrated in FIG. 10. Since the operation of the vehicle detection device 130 is the same as that of calculating a reference value, the description thereof is omitted. The computer 110 performs the operation as described below.

First, the computer 110 performs an operation similar to that of calculating a reference value to thereby acquire the latest reference value of the structure 140, and stores it in the storage unit 116 as a new reference value 1167 (step S41). Then, the diagnosis unit 1179 reads all of the reference values 1167 from the storage unit 116, and compares the latest reference value thereof with a past reference value (step S42). The past reference value to be used may be one that has taken a certain period (for example, half a year) ago. Alternatively, the past reference value to be used may be a reference value that is taken before the occurrence date of a disaster such as an earthquake that has occurred immediately before. Then, the diagnosis unit 1179 determines presence or absence of deterioration of the structure 140 on the basis of the comparison result described above (step S43). For example, when the latest reference value is larger than the past reference value by a certain percentage or a certain value, the diagnosis unit 1179 determines that the structure 140 is deteriorated, and if it is not larger, the diagnosis unit 1179 determines that it is sound.

As described above, according to the present embodiment, it is possible to easily detect a heavy vehicle. This is because the present embodiment includes the vehicle detection device 130 that detects the size of a vehicle that passes through the structure 140 and detects the type of the vehicle from the size of the vehicle. Specifically, the vehicle detection device 130-1 detects the size of a vehicle from the time difference between the clock time that the head of the vehicle has passed and the clock time that the tail thereof has passed. The vehicle detection device 130-2 detects the size of a vehicle on the basis of whether or not the vehicle crosses the reference point that is set at a given height from the surface of the road. The vehicle detection device 130-3 detects the size of a vehicle on the basis of the wind generated along with the passage of the vehicle.

Moreover, according to the present embodiment, it is possible to measure the displacement quantity of the structure 140 when a vehicle is traveling on the structure 140 even in the case of the structure 140 in which an image of the traveling vehicle cannot be captured. This is because the present embodiment includes the vehicle detection device 130 that detects the position, the clock time, the speed, and the vehicle type of a vehicle that travels a pre-passage area of a measurement part of the structure 140, and the computer 110 includes the image acquisition unit 1172 for acquiring time-series data of the deflection quantity generated in the measurement part of the structure 140 by the weight of the vehicle that travels on the structure 140, and the control unit 1176 that estimates the clock time that the vehicle arrives at the measurement part from the position, the clock time, and the speed of the vehicle detected by the vehicle detection device 130 and from the position of the measurement part, and controls the image acquisition unit 1172 on the basis of the estimated clock time.

Further, according to the present embodiment, since the clock time that the vehicle arrives at the measurement part is estimated from the position, the clock time, and the speed of the vehicle detected by the vehicle detection device 130 and the position of the measurement part, it is possible to estimate the arrival time without being affected by the communication delay between the vehicle detection device 130 and the computer 110.

Further, according to the present embodiment, since the image acquisition unit 1172 is controlled on the basis of the clock time that the heavy vehicle arrives at the measurement part of the structure, it is possible to prevent wasteful continuous capturing of the structure by the image acquisition unit 1172 during a period in which no vehicle travels or a period in which a light vehicle is traveling on the structure.

Further, according to the present embodiment, it is possible to calculate a reference value showing the relationship between the vehicle weight applied to the structure 140 and the deflection quantity of the structure 140. Further, according to the present embodiment, by using the reference value, it is possible to calculate the weight of the vehicle, whose weight is unknown, traveling on the structure 140. Further, according to the present embodiment, deterioration diagnosis of the structure 140 can be performed with use of the reference value.

The present embodiment can be applied with various additions and modifications as described below.

While estimation of the arrival time is performed by the computer 110 in the above description, it may be performed by the vehicle detection device 130. In the configuration of estimating the arrival time by the vehicle detection device 130, a means similar to the arrival time estimation unit 1175 provided to the computer 110 is provided to the vehicle detection device 130 side. At that time, in the case of performing processing to obtain the position of the area 141 that is a measurement part from the camera position/direction 1162 by the computer 110, the configuration is made to transmit the obtained longitude and latitude of the area 141 from the computer 110 to the vehicle detection device 130. Alternatively, in the case of performing processing to obtain the position of the area 141 that is a measurement part from the camera position/direction 1162 by the vehicle detection device 130, the configuration is made to transmit the camera position/direction 1162 from the computer 110 to the vehicle detection device 130.

Further, in the case of performing estimation of the arrival time by the vehicle detection device 130, the timing to start operation of the image acquisition unit 1172 on the basis of the arrival time and the timing to end the operation may be controlled remotely from the vehicle detection device 130. In the configuration of remotely controlling the image acquisition unit 1172 from the vehicle detection device 130, a means similar to the control unit 1176 provided to the computer 110 is provided to the vehicle detection device 130 side, and the configuration is made to transmit a control signal from the vehicle detection device 130 to the computer 110 via communication.

Further, while the vehicle detection device 130 detects a vehicle in the pre-passage area 151 of the structure 140 in the above description, the vehicle detection device 130 may detect a vehicle in a section from the entrance of the structure 140 up to the area 141.

Further, while the deflection quantity is detected in the above description, displacement quantity to be detected is not limited to the deflection quantity. For example, in the case where the structure 140 has a crack, when the load is applied to the structure 140, the width of the crack expands. Therefore, the width of the crack in the structure may be detected as the displacement quantity.

Further, in the above description, displacement of the structure 140 is detected on the basis of an image captured by a camera capturing the structure 140. However, a sensor that detects displacement of the structure 140 is not limited to a camera. For example, the deflection quantity of the structure 140 may be detected by a laser range finder. Alternatively, displacement such as the deflection quantity and the crack width of the structure 140 may be detected by a deflection gauge, for example.

Second Exemplary Embodiment

Figure 11:
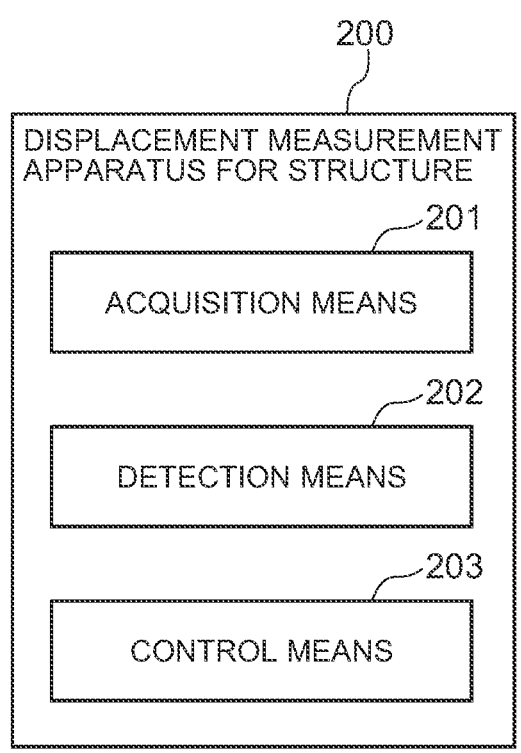
FIG. 11 is a block diagram illustrating a displacement measurement apparatus according to a second exemplary embodiment of the present invention.

Next, a second exemplary embodiment of the present invention will be described with reference to FIG. 11. FIG. 11 is a block diagram illustrating a displacement measurement apparatus for a structure according to the present embodiment. Note that the present embodiment describes the outline of a displacement measurement apparatus for a structure of the present invention.

Referring to FIG. 11, a displacement measurement apparatus 200 for a structure according to the present embodiment is configured to include an acquisition means 201, a detection means 202, and a control means 203.

The acquisition means 201 is configured to acquire, in a time-series manner, the displacement quantity that is generated at a measurement part of the structure by the weight of a vehicle that travels on the structure. The acquisition means 201 may be configured similarly to the image acquisition unit 1172 and the deflection acquisition unit 1173 of FIG. 5, but is not limited thereto.

The detection means 202 is configured to detect the size of a vehicle that passes through the structure, and detect the type of the vehicle from the size. The detection means 202 may be configured similarly to the vehicle detection device of FIGS. 2 to 4, but is not limited thereto.

The control means 203 is configured to control the acquisition means 201, on the basis of the type of the vehicle detected by the detection means 202. The control means 203 may be configured similarly to the control unit 1176 of FIG. 5, but is not limited thereto.

The displacement measurement apparatus 200 for a structure, configured as described above, operates as described below. That is, first, the detection means 202 detects the size of a vehicle that passes through the structure, and detects the type of the vehicle from the size. Then, the control means 203 controls the acquisition means 201 on the basis of the type of the vehicle detected by the detection means 202. The acquisition means 201 acquires, in a time-series manner, the displacement quantity that is generated at the measurement part of the structure by the weight of the vehicle that travels on the structure.

As the present embodiment is configured and operates as described above, it is possible to easily detect a heavy vehicle. This is because the present embodiment includes the detection means 202 that detects the size of a vehicle that passes through a structure and detects the type of the vehicle from the size.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to the case of measuring the displacement quantity such as deflection quantity of a structure generated by a vehicle that passes through the structure such as a bridge.

The whole or part of the exemplary embodiments disclosed above can be described as, but not limited to, the following supplementary notes.

[Supplementary Note 1]

A displacement measurement apparatus for a structure, the apparatus comprising:
 acquisition means for acquiring displacement quantity in a time-series manner, the displacement quantity being generated at a measurement part of the structure by weight of a vehicle that travels on the structure;
 detection means for detecting size of the vehicle that passes through the structure, and detecting a type of the vehicle from the size; and
 control means for controlling the acquisition means on a basis of the detected type of the vehicle.

[Supplementary Note 2]

The displacement measurement apparatus for the structure according to supplementary note 1, wherein
 the detection means is configured to detect the size of the vehicle on a basis of a detection result by a sensor that detects a time difference between clock time that head of the vehicle passes through and clock time that tail of the vehicle passes through.

[Supplementary Note 3]

The displacement measurement apparatus according to supplementary note 1, wherein
 the detection means is configured to detect the size of the vehicle on a basis of an analysis result of a measurement value of an anemometer that measures wind generated along with passage of the vehicle.

[Supplementary Note 4]

The displacement measurement apparatus for the structure according to supplementary note 1, wherein
 the detection means is configured to detect the size of the vehicle on a basis of a detection result by a sensor that detects whether or not the vehicle crosses a reference point that is set at a predetermined height from a road surface.

[Supplementary Note 5]

The displacement measurement apparatus for the structure according to any of supplementary notes 1 to 4, wherein
 the detection means is further configured to detect a position and clock time of the vehicle that travels a pre-passage area of the measurement part, and
 the apparatus further comprises an estimation means configured to estimate arrival time that the vehicle arrives at the measurement part, from the position of the measurement part and the position and the clock time of the vehicle, and
 the control means is configured to control the acquisition means on a basis of the detected type of the vehicle and the estimated arrival time.

[Supplementary Note 6]

The displacement measurement apparatus for the structure according to supplementary note 5, wherein
 the detection means is configured to detect the position and the clock time of the vehicle on a basis of a position of a reference point that is set in the pre-passage area and a detection result by a sensor that detects clock time that the vehicle passes through the reference point.

[Supplementary Note 7]

The displacement measurement apparatus for the structure, according to supplementary note 5, wherein
 the estimation means is configured to calculate a period of time necessary for the vehicle to move from the position of the vehicle to the position of the measurement part at a vehicle speed that is set and stored in advance, and calculate the arrival time from the calculated period of time and the detected clock time.

[Supplementary Note 8]

The displacement measurement apparatus for the structure, according to supplementary note 5, wherein
 the detection means is further configured to detect speed of the vehicle, and
 the estimation means is configured to calculate a period of time necessary for the vehicle to move from the detected position of the vehicle to the position of the measurement part at the detected speed of the vehicle, and calculate the arrival time from the calculated period of time and the detected clock time.

[Supplementary Note 9]

The displacement measurement apparatus for the structure, according to any of supplementary notes 5 to 8, wherein the control means is configured to allow the acquisition means to perform the acquisition during a period from clock time before the arrival time by a certain period of time to clock time after the arrival time by a certain period of time.

[Supplementary Note 10]

The displacement measurement apparatus for the structure, according to any of supplementary notes 5 to 8, wherein
 the control means is configured to calculate an error in the arrival time, and allow the acquisition means to perform the acquisition during a period from clock time before the arrival time by the error to clock time after the arrival time by the error.

[Supplementary Note 11]

A displacement measurement method for a structure, the method comprising:
 acquiring displacement quantity in a time-series manner, the displacement quantity being generated at a measurement part of the structure by weight of a vehicle that travels on the structure;
 detecting size of the vehicle that passes through the structure, and detecting a type of the vehicle from the size; and
 controlling the acquisition on a basis of the detected type of the vehicle.

[Supplementary Note 12]

A computer-readable storage medium storing therein a program for causing a computer to perform processing of:
 acquiring displacement quantity in a time-series manner, the displacement quantity being generated at a measurement part of the structure by weight of a vehicle that travels on the structure;
 detecting size of the vehicle that passes through the structure, and detecting a type of the vehicle from the size; and controlling the acquiring on a basis of the detected type of the vehicle.

REFERENCE SIGNS LIST 100 displacement measurement apparatus for structure
110 computer
120 camera
121 cable
130 vehicle detection device
140 structure
141 area
150 road
151 pre-passage area
200 displacement measurement apparatus for structure
201 acquisition means
202 detection means
203 control means

The invention claimed is:

1. A displacement measurement apparatus for a structure, the apparatus comprising:
a memory containing program instructions; and
a processor coupled to the memory, wherein the processor is configured to execute the program instructions to:
acquire displacement quantity in a time-series manner, the displacement quantity being generated at a measurement part of the structure by weight of a vehicle that travels on the structure;
detect a size of the vehicle that passes through the structure, on a basis of an analysis result of determining whether or not a change pattern of a strength and a direction of wind generated along with passage of the vehicle and that is measured by an anemometer is identical or similar to a reference change pattern that is registered and stored in advance;
detect a type of the vehicle from the size; and
control acquisition of the displacement quantity on a basis of the detected type of the vehicle.

2. The displacement measurement apparatus for the structure according to claim 1, wherein the processor is further configured to:
detect a position and clock time of the vehicle that travels a pre-passage area of the measurement part; and
estimate an arrival time at which the vehicle arrives at the measurement part, from a position of the measurement part and the position and the clock time of the vehicle, and
the acquisition of the displacement quantity is further controlled on a basis of the estimated arrival time.

3. The displacement measurement apparatus for the structure according to claim 2, wherein
the position and the clock time of the vehicle are detected on a basis of a position of a reference point that is set in the pre-passage area and a detection result by a sensor that detects a clock time that the vehicle passes through the reference point.

4. The displacement measurement apparatus for the structure, according to claim 2, wherein
estimation of the arrival time includes calculation of a period of time necessary for the vehicle to move from the position of the vehicle to the position of the measurement part at a vehicle speed that is set and stored in advance, and
the arrival time is calculated from the calculated period of time and the detected clock time.

5. The displacement measurement apparatus for the structure, according to claim 2, wherein the processor is further configured to:
detect speed of the vehicle, and
estimation of the arrival time includes calculation of a period of time necessary for the vehicle to move from the position of the vehicle to the position of the measurement part at the detected speed of the vehicle, and
the arrival time is calculated from the calculated period of time and the detected clock time.

6. The displacement measurement apparatus for the structure, according to claim 2, wherein
the acquisition of the displacement quantity is controlled such that the acquisition is allowed to be performed during a period from a clock time before the arrival time by a certain period of time to a clock time after the arrival time by the certain period of time.

7. The displacement measurement apparatus for the structure, according to claim 2, wherein
the acquisition of the displacement quantity is controlled such that an error in the arrival time is calculated, and the acquisition is allowed to be performed during a period from a clock time before the arrival time by the error to a clock time after the arrival time by the error.

8. A displacement measurement apparatus for a structure, the apparatus comprising:
a memory containing program instructions; and
a processor coupled to the memory, wherein the processor is configured to execute the program instructions to:
acquire displacement quantity in a time-series manner, the displacement quantity being generated at a measurement part of the structure by weight of a vehicle that travels on the structure;
detect a size of the vehicle that passes through the structure, on a basis of an analysis result of determining whether or not a strength of wind generated along with passage of the vehicle and that is measured by an anemometer exceeds a threshold that is set and stored in advance;
detect a type of the vehicle from the size; and
control acquisition of the displacement quantity on a basis of the detected type of the vehicle.

* * * * *